United States Patent [19]

Grätzel

[11] 4,032,477

[45] June 28, 1977

[54] METHOD OF ENHANCING THE ELECTRON YIELD DURING PHOTOIONIZATION OF A SENSIBILIZER

[75] Inventor: Michael Grätzel, Berlin, Germany

[73] Assignee: Hahn-Meitner-Institut fur Kernforschung Berlin GmbH, Berlin, Germany

[22] Filed: Mar. 18, 1976

[21] Appl. No.: 668,291

[30] Foreign Application Priority Data

Mar. 27, 1975 Germany .......................... 2513746

[52] U.S. Cl. ........................... 252/501; 204/158 R
[51] Int. Cl.² .......................................... B01J 1/10
[58] Field of Search ................ 252/501; 204/158 R; 136/89

[56] References Cited

OTHER PUBLICATIONS

Radiation Research 54, 49–62 (1973), "Reactions in Micellar Systems".
Journal of Physical Chemistry, vol. 78, No. 2, (1974), pp. 190–195.
Journal of Chemical Physics, vol. 62, No. 5, Mar. 1, 1975, pp. 1632–1640.
Journal of the American Chemical Society, 97:8, Apr. 16, 1975, pp. 2052–2057.

*Primary Examiner*—Richard E. Schafer
*Assistant Examiner*—E. Suzanne Parr
*Attorney, Agent, or Firm*—Hans Berman

[57] ABSTRACT

An enhanced electron yield is obtained during irradiation of a sensibilizer with light in the presence of water when a hydrophobic organic material is present as a separate phase having an electron repelling surface in contact with the water and containing the sensibilizer.

6 Claims, No Drawings

METHOD OF ENHANCING THE ELECTRON YIELD DURING PHOTOIONIZATION OF A SENSIBILIZER

This invention relates to the generation of electrons by treatment of a sensibilizer with electromagnetic radiation, such as sun light, and particularly to a method of enhancing the electron yield during radiation treatment in the presence of water.

It is known that electrons are liberated when electromagnetic radiation, such as sun light, impinges on substances having a low ionization potential, so-called sensibilizers, whereby an electron-ion pair is formed. If the photoionization occurs in an aqueous solution, hydrated electrons of the formula $e^-\cdot aq$ are formed and have strong reducing properties. Their life, however, is too short to permit their use in chemical reactions. Because of the rapid neutralization of the ion-electron pair, a significant concentration of hydrated electrons could not be achieved heretofore.

It is a primary object of this invention to modify the known radiation treatment in such a manner as to increase the life of the hydrated electrons and to improve the electron yield.

It has been found that the life of the generated electrons can be increased substantially, and the yield of available electrons enhanced if the sensibilizer is irradiated while associated with or contained in a hydrophobic organic material which constitutes a phase separate from the water present, and has a large, electron-repelling surface in contact with the water.

While the exact mechanism of the improved method has not yet been established with certainty, the available evidence is consistent with the assumption that the electron-repelling surface of the organic material acts in the manner of a membrane which impedes the combination of the electrons formed by photoionization with the simultaneously formed ions. If the organic material is liquid, the sensibilizer may be dissolved therein, and it may be associated otherwise with the organic material if the latter is solid. A liquid organic material may constitute the dispersed phase of an emulsion in which the aqueous phase is continuous, and each liquid particle of the dispersed phase may have a negatively charged surface. The organic material may consist of an organic compound having a negatively charged surface because of its structure, or it may mainly consist of an organic compound free from electric charges, such as a hydrocarbon, in which a surfactant is dissolved to provide the electron-repelling surface.

A preferred, hydrophobic, organic material for use in the method of the invention is an anionic surfactant capable of forming micellas. Suitable surfactants include, but are not limited to, alkylsulfonates, alkyl sulfates, alkyl carboxylates, cholanic acid and its salts, alkylarylsulfonates, alkyl phosphates, salts of alkylbenzenephosphonic acids, sulfosuccinic acid esters, sulfated ethers, sulfated fatty acid alkylolamides, sulfated fatty acid monoglycerides, sulfated amides, sulfated esters, sulfated oils and fatty acids, and certain modified soaps. At least eight carbon atoms need to be present in the alkyl radical of these surfactants to permit the building of micellas.

If the hydrophobic organic material is a solid, it may consist of an anion exchanger, such as sulfonated styrene-divinylbenzene copolymer, styrene-acrylic acid copolymer, derivatives of polyacrylic acid, and the like. Other suitable, hydrophobic organic materials include polymers having repeated anionic groups, such as polystyrenesulfonate as it is obtained by emulsion polymerization, partly saponified esters of polyacrylic and polymethacrylic acid, copolymers of acrylic, methacrylic, and maleic acid, and the like.

The sensibilizers employed in this method are distinguished by molecules having a low ionization potential and distinct affinity to the hydrophobic organic phase. Suitable sensibilizers are polycyclic hydrocarbons such as anthracene, pyrene, naphthazene, and the like which are ionized by light of relatively shorted wave length. Light within the visible spectrum and in the near ultra-violet is employed if the sensibilizers are heterocyclic compounds such as phenothiazine, phenoxazine, dihydrophenazine, carbazole and their derivatives, or chlorophyll. Other suitable sensibilizers include such aromatic amines as diphenyl-p-phenylenediamine, tetramethyl-p-phenylenediamine, benzidine derivatives, and the like.

Sensibilizers known from photochemistry, such as polymethine and cyanine dyes containing several, nitrogen-bearing hetrocyclic rings connected by a chain of methine groups having conjugated double bonds, are useful in practicing this invention if they have sufficient affinity to the hydrophobic organic phase to be contained in the same entirely or practically entirely.

It is a common feature of the sensibilizers of the invention that they are very sparingly soluble or practically insoluble in water.

The water present in the other phase in contact with the hydrophobic organic material lowers the ionization potential of the sensibilizers and thereby enhances the yield of the photoionization. Water constitutes a potential trap for the electrons ejected by irradiation. The aqueous phase may also serve as a solvent for the acceptors which are intended to be reduced by the hydrated electrons.

Neutralization of the latter is delayed substantially by the electron-repelling characteristics of the lipophilic boundary layer separating the two phases which are due to the presence of anions or anionic groups. The quantum yield of electrons formed from the sensibilizer and entering the water from the hydrophobic organic material is greater by a factor of about $10^1$ to $10^2$ as compared to the use of a single-phase system. This is readily ascertained by determining the absorption spectrum of $e^-\cdot aq$ or by the addition of specific acceptors capable of reacting only with $e^{116}\cdot aq$, such as nitrogen monoxide and nitrate ions. The hydrogen formed also can be determined by chromatography.

The method of the invention is generally applicable to reduction processes and may also be employed, for example, for producing hydrogen by means of sunlight according to the overall formula $e^- \ aq + H_2O \rightarrow \frac{1}{2} H_2 + OH^-$.

The following Example is further illustrative of this invention.

EXAMPLE

A two-phase system consisting of water free from dissolved oxygen, 0.1 mole sodium lauryl sulfate per liter as the micella forming, hydrophobic organic phase, and $10^{-4}$ mole phenothiazine per liter as sensibilizer, was irradiated for 20 nanoseconds with a light pulse of wavelength 347.1 nm. The hydrated electrons formed were detected immediately after the pulse by the method of G. Porter [Proc. Roy Soc. *A* 200 (1950)

284]. The formation of hydrogen was observed within approximately 100 microseconds after the light pulse. The quantum yield of electrons formed from the sensibilizer and entering the water from the micellas was 0.5. When the same pulse was applied to the same sensibilizer in a single solvent phase, the quantum yield was only 0.025.

What is claimed is:

1. In a method of generating electrons by irradiation of a sensibilizer with light in the presence of water, the improvement which comprises a hydrophobic organic polymer having repeating anionic groups present as a separate phase having an electron-repelling surface in contact with said water, said polymer containing said sensibilizer.

2. In a method as set forth in claim 1, said organic polymer constituting the dispersed phase, and said water constituting the continuous phase of an emulsion, the surface of each particle of said dispersed phase being negatively charged.

3. In a method as set forth in claim 2, said anionic groups being located in the surface of each of said particles and providing the negative charge thereof.

4. In a method as set forth in claim 1, said organic polymer being an anion exchange resin.

5. In a method as set forth in claim 1, said sensibilizer being a member of the group consisting of polycyclic hydrocarbons, aromatic amines, and heterocyclic compounds.

6. In a method as set forth in claim 5, said sensibilizer being practically insoluble in water.

* * * * *